Aug. 9, 1960          J. R. KUHN          2,948,431
PRESSURE COOKERS
Filed April 21, 1958          3 Sheets-Sheet 1
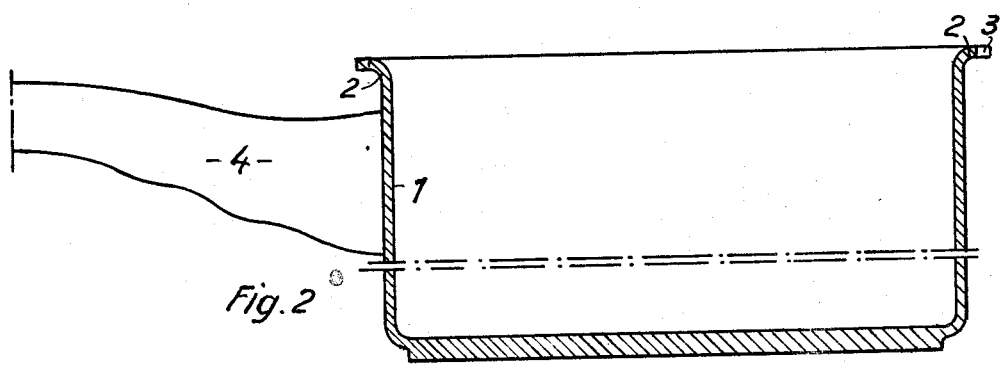
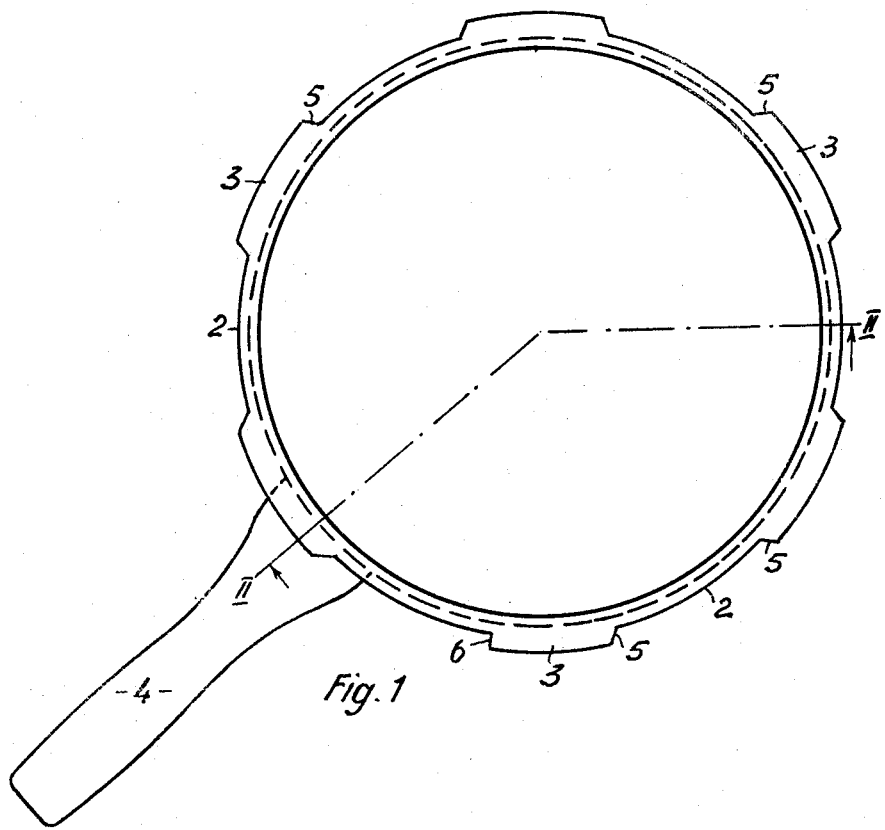
INVENTOR:
JACQUES R. KUHN
AGENT

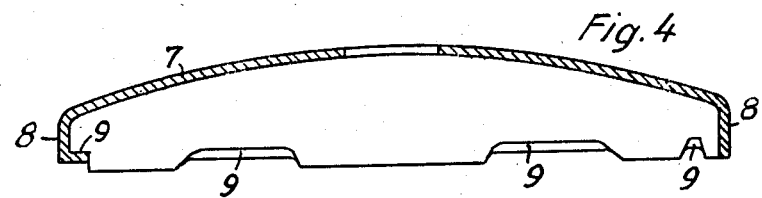
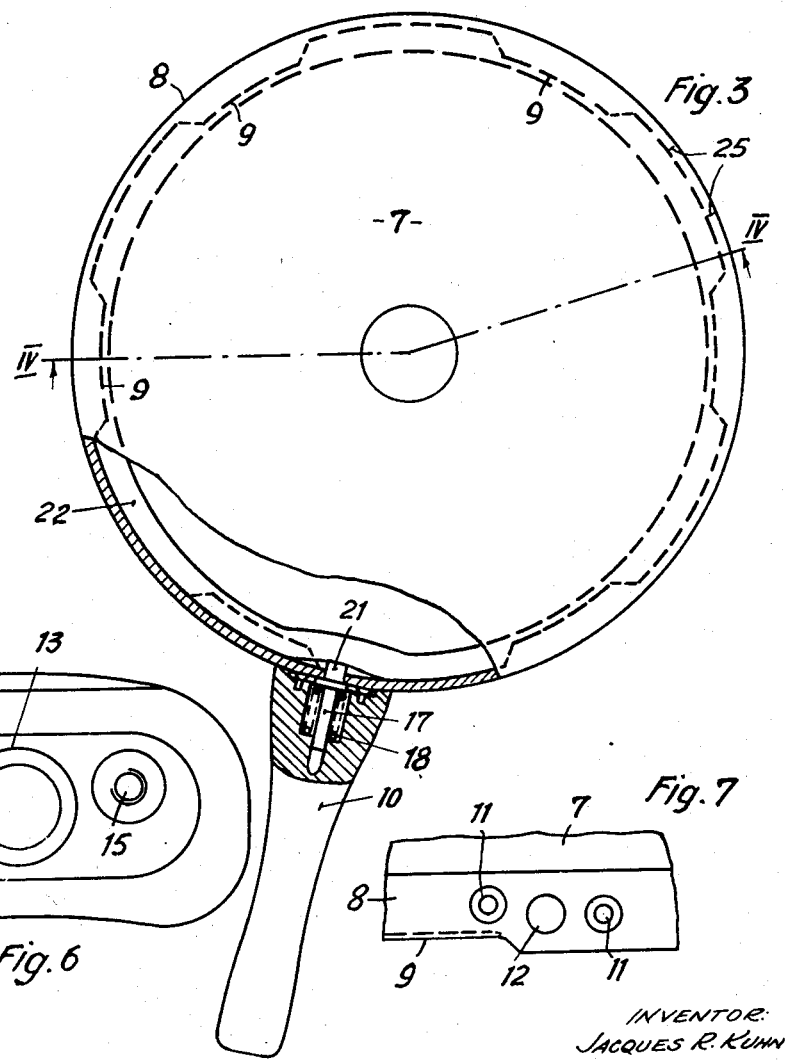

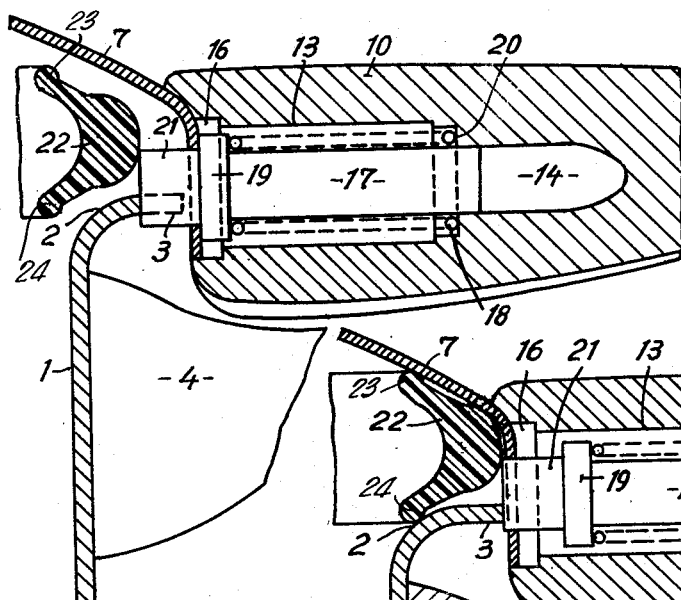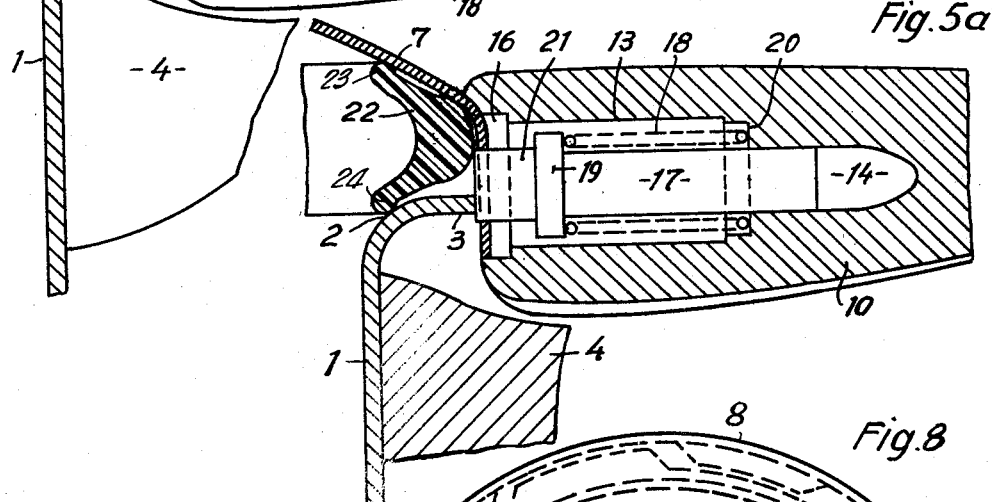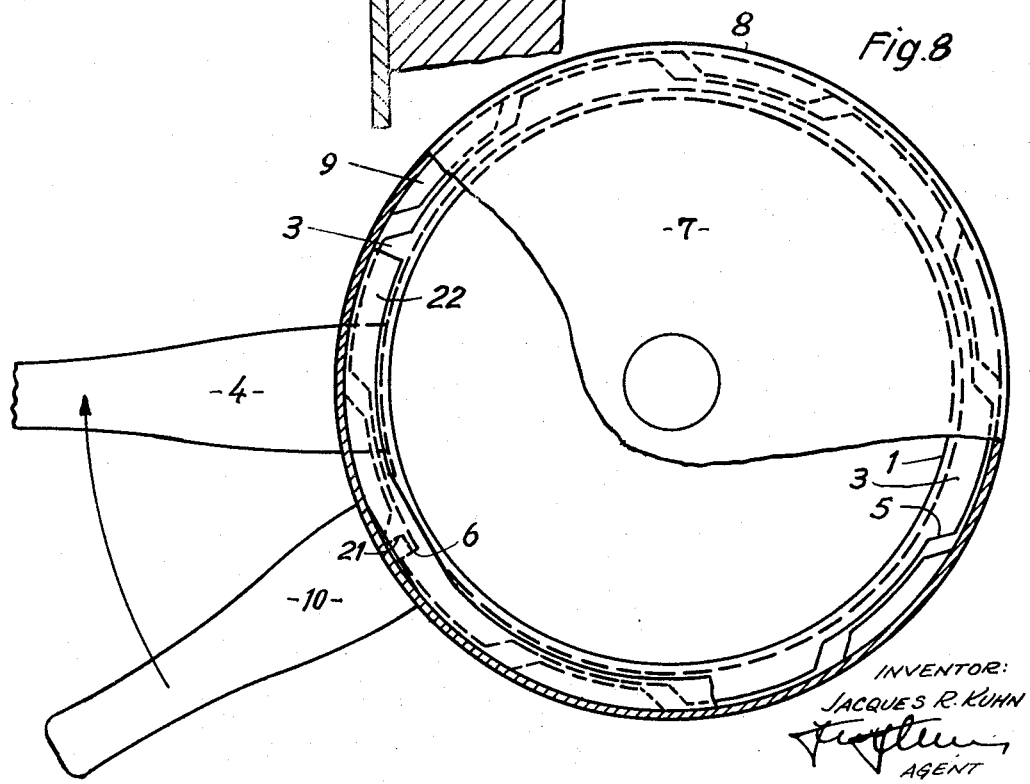

United States Patent Office 2,948,431
Patented Aug. 9, 1960

2,948,431

PRESSURE COOKERS

Jacques R. Kuhn, Rikon, Switzerland, assignor to Max Keller, Zurich, Switzerland Filed Apr. 21, 1958, Ser. No. 729,903

Claims priority, application Switzerland Apr. 26, 1957

5 Claims. (Cl. 220—40)

The invention relates to a pressure cooker comprising a pot and a lid whose flanges are provided with lugs forming a bayonet joint which, upon rotation of the lid with respect to the pot in one direction, can be brought into locking position whereby a packing ring located in the lid hermetically seals the interior of the pot.

The pressure cooker further comprises a member which is under spring pressure and which, when the lid has been placed onto the pot, cooperates with a preferably cam shaped guide to maintain a portion of the packing ring within its reach in such position as to establish communication between the interior of the pot and the atmosphere. When the bayonet joint is in locking position, a controlling means located on the pot axially displaces the aforementioned member, thus permitting return of the packing ring into sealing position.

An embodiment of the invention illustrated in the accompanying drawings, in which Fig. 1 is a top plan view of the pot;

Fig. 2 is a vertical section taken on the line II—II of Fig. 1 as seen in the direction of arrows;

Fig. 3 is a top plan view of the lid with a portion thereof broken away and with a part of its handle shown in section;

Fig. 4 is a section through the lid taken on the line IV—IV of Fig. 3 as seen with direction of arrows;

Fig. 5 is an enlarged section through a part of the pressure cooker showing the parts mounted in the handle of the lid and the packing ring in non-sealing position;

Fig. 5a is a section similar to the section of Fig. 5 but showing the packing ring in sealing position;

Fig. 6 is an enlarged and elevational view of the handle for the lid;

Fig. 7 is a smaller-scale fragmentary view of that portion of the lid to which the handle is to be fixed; and Fig. 8 is a plan view of the pressure cooker with the lid disposed on the pot in readiness for the final rotational closing operation, a portion of the lid being broken away for the sake of clarity.

The pot 1 (see Figs. 1 and 2) of the pressure cooker has an outwardly extending flange 2 whose circular edge is formed with a number of lugs 3. Secured to the pot 1 is a handle 4. The transition of the lugs 3 to the edge of the flange 2 is by way of oblique edges 5: In the case of one lug 3, one transition to the edge of the flange 2 is by way of an edge 6 which is perpendicular to the flange of the pot (Fig. 1).

The lid 7 (Figs. 3 and 4) has a depending cylindrical flange 8 the lower end of which is formed with a number of inwardly extending spaced lugs 9 whose number corresponds to the number of lugs 3 of the pot. A handle 10 (Figs. 3, 5, 5a and 8) is fixed to the cylindrical flange 8 by means of screws. The cylindrical flange 8 of the lid is, for the purpose of passing therethrough the fixing screws (not shown), provided with two bores 11 (Fig. 7), between which there is another bore 12. The handle 10 itself has, in its axis, a cylindrical depression 13 which is extended by a blind hole 14, which has a smaller diameter than the depression 13 (see Fig. 6). On the two sides respectively of the depression 13 are two tapped blind holes 15 for receiving the fixing screws. The blind holes 15 and the depressions 13 are located within an oblong depression 16 which is covered by the flange 8 of the lid. The depression 13 serves for receiving a reciprocable member shown as a bolt 17, the rear end of which projects into the blind hole 14, as well as a compression spring 18, one end of which rests on a flange 19 of the bolt 17 and the other end of which rests on a shoulder 20 provided between the depression 13 and the blind hole 14. The bolt 17 is extended by a pin 21 which projects through the bore 12, the flange 19 resting on the outer side of the flange 8.

As a packing member for obtaining hermetic sealing when the lid is locked, there is inserted, within the flange 8 of the lid, a packing ring 22 (Figs. 3, 5, 5a and 8) which is prevented from dropping out by the lugs 9. The packing ring 22 has two arms 23 and 24, one of which rests on the inner side of the lid and the other rests on the rounded transition part of the pot, which is located between the cylindrical or approximately cylindrical part of the pot and the flange 2 after the lid has been placed onto the pot. The middle part of the packing ring which connects the two arms 23 and 24 is rounded.

In order to close the pot, the lid is put on the pot in such a manner (Fig. 8) that the axis of the handle 10 encloses an angle of less than 90° with the axis of the handle 4, in which position the lugs 9 pass through the spaces between the lugs 3, the pin 21 resting on the radial lug edge 6 which serves as a stop. The pin 21 presses inwardly that part of the packing ring 22 which lies within its reach, i.e. in the direction towards the axis of the lid, so that the arm 24 cannot rest on the inner side of the pot in the sealing sense and there is communication between the interior of the pot and the atmosphere. By rotating the lid in the clockwise direction, the axis of the handle 10 is brought over the axis of the handle 4, the front end of the pin 21 sliding off over the edge of the flange 2 between the two adjacent lugs 3. Shortly before the axis of the handle 10 comes to lie vertically above the axis of the handle 4, the pin 21, which now slides over the oblique edge 5, is displaced, thus compressing the spring 18 and displacing the bolt 17 axially, so that the part of the packing ring, which is now released, can assume its sealing position (see Fig. 5a).

On unlocking the lid by rotating it in the counterclockwise direction, the pin 21 first slides, under the action of the spring 18, from its position in which it releases the packing ring 22, as soon as the oblique edge 5 at the transition from the edge of flange 2 renders it possible. From that point of time until the complete unlocking of the bayonet joint, i.e. until the pin 21 rests on the radial edge 6 which acts as a stop, communication between the interior of the pot and the atmosphere is again established (see Fig. 5); this renders possible a safe lifting of the lid.

In the embodiment described, the packing ring lies loosely within the flange 8 and is prevented from dropping out merely by the lugs 9 of the lid. It can therefore easily be taken out for cleaning and be again inserted in the lid before using the pot. The lid itself may be made of stainless sheet steel for example.

In the embodiment described, the member 17, 21, which is under spring pressure, is accommodated in a depression in the handle 10 and is guided by the flange 2 of the pot and controlled by its lugs 3. This bolt 17, 21 could be arranged with the employment of a separate, suitably constructed carrier to be fixed at any desired position on the flange 8. In that case, the control of the bolt may likewise be effected by the flange 2 as a controlling cam, but it is also possible to provide on the pot, at a suitable position in the path of movement of the bolt when the lid rotates with regard to the pot, a controlling cam which pushes the bolt back into its carrier when the handle 10 comes to lie over the handle 4.

What I claim is:

1. A pressure cooker comprising, in combination: an open pot which is provided about its open end with an outwardly extending flange having a circular edge formed with spaced lugs; a lid having a depending cylindrical flange, the lower end of which is formed with inwardly extending spaced lugs equal in number to the number of lugs on the pot and constituting with the lugs on said pot a bayonet joint lockable and unlockable upon rotation of the lid with respect to the pot; a packing ring located in and adjacent to the flange of said lid for forming a seal between the lid and the pot when the bayonet joint is in locking position; a member carried by, and extendable into the interior of said lid for moving a portion of said ring away from sealing contact with the pot; and resilient means operatively connected with said member for constantly urging same in a direction to extend into the lid; the flange and the lugs of said pot constituting cam means for moving said member toward and away from the center of the lid when the lid is rotated with respect to said pot, the cam means permitting said resilient means to extend the member into the interior of the lid whereby to displace a portion of the ring when the bayonet joint is unlocked, and the cam means moving the member against the action of said resilient means when the bayonet joint is in locking position whereby the ring is free to form a seal between the pot and the lid.

2. A pressure cooker as set forth in claim 1, wherein said cam means comprises a pair of adjacent lugs on said pot and a portion of the flange on the pot between said pair of lugs, one of said pair of lugs engaging with the member and moving same against the action of said resilient means when the bayonet joint is in locking position and said flange portion abutting against the member when the bayonet joint is unlocked.

3. A pressure cooker as set forth in claim 2, wherein the other of said pair of lugs on the pot has a substantially radial edge constituting a stop for engaging with said member and for limiting the rotation of the lid with respect to the pot in one direction.

4. A pressure cooker as set forth in claim 1, further comprising a handle connected to said lid and having a depression therein for receiving said resilient means, said member being a bolt reciprocably received in said depression and comprising a pin extendable into the lid by said resilient means.

5. A pressure cooker as set forth in claim 4, further comprising a second handle connected to said pot and aligned with the first mentioned handle when the bayonet joint is in locking position.

References Cited in the file of this patent

UNITED STATES PATENTS 2,105,487     Lozon _____ Jan. 18, 1938

FOREIGN PATENTS 130,320     Sweden _____ Dec. 12, 1950